United States Patent
Mallikarjunan et al.

(10) Patent No.: US 9,451,551 B2
(45) Date of Patent: Sep. 20, 2016

(54) CONTROLLING A POWER STATE OF A CELLULAR PACKET DATA SUBSYSTEM IN A PORTABLE ELECTRONIC DEVICE

(71) Applicant: Apple Inc., Cupertino, CA (US)

(72) Inventors: Raghuveer Mallikarjunan, Sunnyvale, CA (US); Sarin S. Mehta, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 13/742,056

(22) Filed: Jan. 15, 2013

(65) Prior Publication Data
US 2014/0177495 A1    Jun. 26, 2014

Related U.S. Application Data

(60) Provisional application No. 61/745,332, filed on Dec. 21, 2012.

(51) Int. Cl.
| | | |
|---|---|---|
| *H04W 24/00* | (2009.01) | |
| *H04W 72/04* | (2009.01) | |
| *H04W 52/02* | (2009.01) | |

(52) U.S. Cl.
CPC ..... *H04W 52/0274* (2013.01); *H04W 52/0245* (2013.01); *Y02B 60/50* (2013.01)

(58) Field of Classification Search
USPC ............... 370/253, 311; 455/63.1, 73, 414.1; 713/100
See application file for complete search history.

(56) References Cited

U.S. PATENT DOCUMENTS

| | | | |
|---|---|---|---|
| 6,473,600 B1 | 10/2002 | Dvorkin | |
| 6,799,050 B1 * | 9/2004 | Krasner | G01S 19/21 342/357.59 |
| 7,174,138 B2 | 2/2007 | Webster et al. | |
| 8,238,966 B2 | 8/2012 | Salowey | |
| 8,279,802 B1 * | 10/2012 | Singh | H04W 4/14 370/328 |
| 8,918,066 B2 | 12/2014 | Hu et al. | |
| 2002/0102992 A1 * | 8/2002 | Koorapaty et al. | 455/456 |
| 2005/0054383 A1 | 3/2005 | Webster et al. | |

(Continued)

OTHER PUBLICATIONS

International Search Report on and the Written Opinion of the International Searching Authority, mailing date Apr. 12, 2013, for related International Application No. PCT/US2013/043810, 14 pages.

*Primary Examiner* — Edan Orgad
*Assistant Examiner* — Sithu Ko
(74) *Attorney, Agent, or Firm* — Sterne, Kessler, Goldstein & Fox PLLC

(57) ABSTRACT

A method and system are described for use in a portable electronic device that includes a wireless local area network (WLAN) subsystem, a cellular packet data subsystem for communicating packet data, a cellular voice subsystem for communicating cellular voice information, and a processing subsystem. In the described embodiments, the WLAN subsystem establishes a connection to a WLAN and the WLAN subsystem then determines the signal strength of the connection to the WLAN. Then, on condition that the signal strength exceeds a threshold, the processing subsystem selects the WLAN subsystem for the communication of packet data to and from the portable electronic device, and puts the cellular packet data subsystem into a reduced power state that reduces the power consumption of the cellular packet data subsystem. Packet data is then communicated to and from the portable electronic device using the WLAN subsystem while the cellular data subsystem is in the reduced power state.

18 Claims, 3 Drawing Sheets

(56) References Cited

U.S. PATENT DOCUMENTS

| | | | |
|---|---|---|---|
| 2006/0003700 A1* | 1/2006 | Yasuda | G08B 13/1427 455/41.2 |
| 2007/0060130 A1* | 3/2007 | Gogic et al. | 455/440 |
| 2008/0227415 A1 | 9/2008 | Harel et al. | |
| 2009/0047991 A1 | 2/2009 | Elg | |
| 2009/0088199 A1* | 4/2009 | Nurminen | H04W 52/0258 455/552.1 |
| 2009/0168676 A1 | 7/2009 | Olson | |
| 2010/0159823 A1* | 6/2010 | Smith | H04B 7/155 455/7 |
| 2010/0249591 A1* | 9/2010 | Heimdal | A61B 8/08 600/443 |
| 2011/0044289 A1* | 2/2011 | Kezys | 370/331 |
| 2011/0211511 A1* | 9/2011 | Bakthavathsalu | H04W 52/0254 370/311 |
| 2011/0249591 A1* | 10/2011 | Abdel-Kader et al. | 370/252 |
| 2011/0300805 A1* | 12/2011 | Gaikwad | H04W 52/244 455/63.1 |
| 2012/0003976 A1 | 1/2012 | Bhat et al. | |
| 2012/0062424 A1 | 3/2012 | Hwang | |
| 2012/0207032 A1* | 8/2012 | Chen | H04L 1/24 370/252 |
| 2013/0039212 A1* | 2/2013 | Li | H04W 52/0245 370/253 |
| 2013/0046967 A1* | 2/2013 | Fullerton | H03K 3/0315 713/100 |
| 2013/0076523 A1* | 3/2013 | Kwan et al. | 340/686.6 |
| 2013/0095869 A1 | 4/2013 | Christofferson et al. | |
| 2013/0196673 A1* | 8/2013 | Smadi | H04W 56/001 455/450 |
| 2013/0252593 A1* | 9/2013 | Soelberg et al. | 455/414.1 |
| 2013/0267182 A1* | 10/2013 | Brandt | H04W 52/18 455/73 |
| 2014/0065974 A1* | 3/2014 | Sane | H04W 52/0254 455/67.11 |
| 2014/0335823 A1* | 11/2014 | Heredia | H04L 12/5895 455/411 |

* cited by examiner

CONTROLLING A POWER STATE OF A CELLULAR PACKET DATA SUBSYSTEM IN A PORTABLE ELECTRONIC DEVICE

RELATED APPLICATION

This application claims priority under 35 U.S.C. §119 to U.S. Provisional Application No. 61/745,332, entitled "Controlling a Power State of a Cellular Packet Data Subsystem in a Portable Electronic Device," by Raghuveer Mallikarjunan and Sarin S. Mehta, filed 21 Dec. 2012, the contents of which are herein incorporated by reference in their entirety.

BACKGROUND

1. Field

The described embodiments relate to controlling power usage for a portable electronic device. More specifically, the described embodiments relate to controlling a power state of a cellular packet data subsystem in a portable electronic device.

2. Related Art

An important feature of many portable electronic devices, such as smartphones and tablet computers, is the ability to communicate packet data to enable activities such as sending and receiving emails or browsing on the Internet. Often, portable electronic devices may communicate such packet data using either a wireless local area network (WLAN) connection such as a Wi-Fi connection, or a cellular data connection to a cellular packet data network such as a 3G or 4G network. However, communicating packet data to and from a portable electronic device consumes power, and since many such devices are powered by batteries, reducing power consumption while still enabling the communication of packet data may increase the length of time such devices can be used before recharging the battery and thereby help improve the user experience.

BRIEF DESCRIPTION OF THE FIGURES

In the figures, like reference numerals refer to the same figure elements.

DETAILED DESCRIPTION

Figure 1:
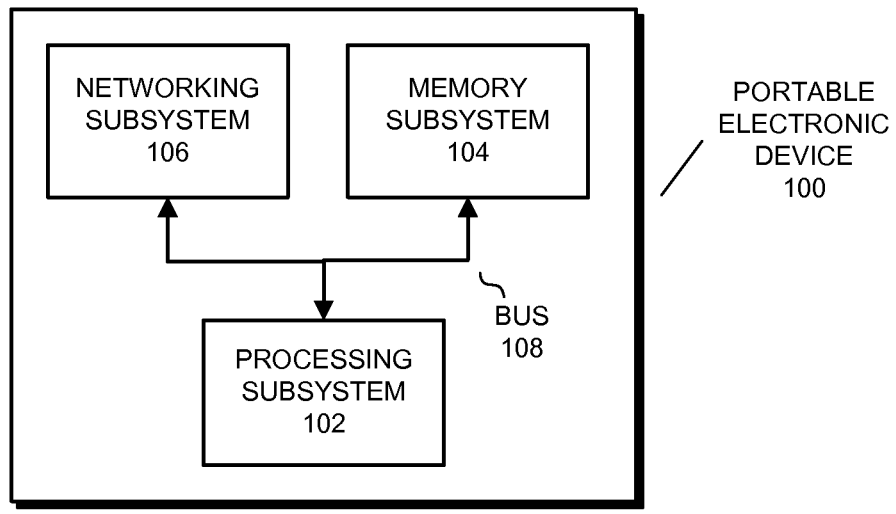
FIG. 1 presents a block diagram illustrating a portable electronic device in accordance with described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a portable electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that, in the described embodiments, the computer-readable storage medium does not include non-statutory computer-readable storage mediums such as transmission signals.

The methods and processes described in this detailed description can be included in hardware modules. For example, the hardware modules can include, but are not limited to, one or more application-specific integrated circuit (ASIC) chips, field-programmable gate arrays (FPGAs), other programmable-logic devices, dedicated logic devices, and microcontrollers. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When a device (e.g., a portable electronic device) with computing capabilities reads and executes the code and/or data stored on the computer-readable storage medium, the device performs the methods and processes embodied as data structures and code and stored within the computer-readable storage medium. For example, in some embodiments, a processing subsystem can read the code and/or data from a memory subsystem that comprises a computer-readable storage medium and can execute code and/or use the data to perform the methods and processes.

In the following description, we refer to "some embodiments," and "other embodiments." Note that "some embodiments" and "other embodiments" each describe a subset of all of the possible embodiments, but do not always specify the same subset of embodiments.

Overview

Described embodiments perform operations for controlling a power state of a cellular packet data subsystem in a portable electronic device. In described embodiments, the portable electronic device can include any portable electronic device that includes both a wireless local area network (WLAN) subsystem for communicating data over a WLAN and a cellular packet data subsystem for communicating packet data over a cellular packet data network (e.g., using the packet-switched domain of a cellular network). A portable electronic device can be or include, but is not limited to, a smartphone, a tablet computer, a laptop computer, a netbook, or any system that includes a cellular packet data subsystem and a WLAN subsystem.

A portable electronic device, such as a smartphone, may communicate packet data with servers or other devices (e.g., electronic devices such as a computer and/or other portable electronic devices) across a network such as the Internet. The packet data (e.g., internet protocol (IP) packets/datagrams) may be communicated to and from the portable electronic device using the cellular packet data subsystem to send and receive packet data over a cellular packet data network (e.g., a 2G/3G or 4G network), or using the WLAN subsystem to send and receive the packet data over a WLAN (e.g., a network implementing 802.11 technology such as a LAN including a portion implementing Wi-Fi technology). Voice communications (e.g., phone calls) may be communicated to and from the portable electronic device using a cellular voice subsystem in the portable electronic device to send and receive voice information (including related phone call information) over a cellular voice network. Note that in some cases the cellular voice information may be sent and received over the same network as the cellular packet data (e.g., both are transmitted by the portable electronic device over a 3G network in which the cellular voice information is transmitted through the circuit-switched domain of the network and the packet data is transmitted through the packet-switched domain of the network), while in some embodiments, cellular packet data may be transferred over one network (e.g., LTE) while voice traffic is transferred over the circuit-switched domain of another network (e.g., 2G or 1x). Additionally, note that voice over IP (VoIP) calls, whether over-the-top (OTT) (e.g., using applications such as Skype), or based on the IP multimedia subsystem (IMS) network use packet data and are not transmitted using the circuit-switched domain of the cellular voice network.

Note also that while the cellular packet data subsystem and the cellular voice subsystem in a portable electronic device may share some components (such as using the same processor, memory, and/or antenna), they may each support a number of separate components such as modems and amplifiers, and may also have different operation methods and use profiles for even the shared systems. For example, in some embodiments, the cellular voice subsystem may use one baseband radio while the cellular packet data subsystem uses another baseband radio, and the cellular packet data subsystem may search for or monitor connectivity at an interval that is different from the interval used by the cellular voice subsystem.

While the cellular packet data subsystem in a portable electronic device is being used to communicate data over a cellular packet data network, the cellular packet data subsystem may maintain many of its systems in a power state that performs a number of tasks related to transmitting data and/or maintaining the cellular data connection in preparation for transmitting data. For example, the cellular packet data subsystem may monitor or search for a cellular data signal from a cellular tower to ensure connectivity or to establish connectivity if it has been lost, and it may also continue to maintain one or more systems energized, such as data buses, modems, and power amplifiers so that these systems are available for use. Note that the cellular voice subsystem may also separately maintain its own systems energized or otherwise ready to receive or initiate a phone call.

When the portable electronic device comes into range of a WLAN, such as a WLAN based on IEEE 802.11 technology (e.g., a local area network that includes a wireless portion implemented using Wi-Fi technology), the portable electronic device may associate with the WLAN. Once associated, it may switch from using the cellular packet data subsystem to communicate packet data over the cellular packet data network, to using the WLAN subsystem to communicate packet data over the WLAN. After the portable electronic device has switched to using the WLAN subsystem, the cellular packet data subsystem may continue to operate in a power state that maintains systems energized and/or performs processes that consume additional power, such as taking actions to establish or maintain its connectivity to the cellular packet data network. Thus, even though packet data is being communicated using the WLAN subsystem, the cellular packet data subsystem may continue to operate in a power state that energizes systems such as modems, buses, and/or other systems that are utilized to establish and/or maintain cellular data connectivity even while no data is being communicated using these systems.

During operation of described embodiments, when the portable electronic device associates with a WLAN (assuming the user and/or portable electronic device has the appropriate authentication), the signal strength of the WLAN is determined by the WLAN subsystem (e.g., using the received signal strength indication (RSSI)). If the WLAN signal strength is determined to be above a threshold level (e.g., −60 dBm, −80 dBm, or −100 dBm), then the portable electronic device may control the cellular packet data subsystem to enter a power state that reduces its power consumption. The portable electronic device may control the cellular packet data subsystem to reduce its power consumption by entering a power state that reduces or eliminates the power used by one or more systems in the cellular packet data subsystem. In some embodiments, the portable electronic device may wait until the signal strength from the WLAN is above a certain minimum threshold and/or the portable electronic device is connected to the WLAN for more than a predetermined period of time (e.g., 30 seconds or 1 minute). The portable electronic device may then control the cellular packet data subsystem to reduce the frequency at which it searches for or checks the status of a cellular data connection. The portable electronic device may also control the cellular packet data subsystem (e.g., through a resource manager) to put one or more systems, such as modems and/or power amplifiers, in a lower power state, or turn them off completely.

Portable Electronic Device

FIG. 1 presents a block diagram illustrating portable electronic device 100 in accordance with described embodiments. Portable electronic device 100 includes processing subsystem 102, memory subsystem 104, and networking subsystem 106 all coupled together and communicating through bus 108.

Processing subsystem 102 includes one or more devices configured to perform computational operations. For example, processing subsystem 102 can include one or more microprocessors, application-specific integrated circuits (ASICs), microcontrollers, application processors, and/or programmable-logic devices.

Memory subsystem 104 includes one or more devices for storing data and/or instructions for processing subsystem 102, and networking subsystem 106. For example, memory subsystem 104 can include any type of computer-readable storage medium, such as dynamic random access memory (DRAM), static random access memory (SRAM), and/or other types of memory. In addition, memory subsystem 104 can include mechanisms for controlling access to the memory. In some embodiments, memory subsystem 104 includes a memory hierarchy that comprises one or more caches coupled to a memory in portable electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by portable electronic device 100 as fast-access storage for often-used data, while the mass-storage device is used to store less frequently used data.

Networking subsystem 106 includes one or more devices configured to couple to and communicate on a wired and/or wireless network (i.e., to perform network operations), including one or more cellular packet data and cellular voice networks (e.g., 3G/4G networks such as 1x, UMTS, LTE, etc.), and WLAN networks, including portions based on standards described in IEEE 802.11 (such as a Wi-Fi networking system). Networking subsystem 106 can include a Bluetooth networking system (which may include Bluetooth low energy (BLE) capabilities, a universal serial bus (USB) networking system, an Ethernet networking system, and/or another networking system. Networking subsystem 106 includes processors, controllers, radios/antennas, sockets/plugs, and/or other devices used for coupling to, communicating on, and handling data and events for each supported networking system. Networking subsystem 106 will be discussed in more detail below with respect to FIG. 2.

Processing subsystem 102, memory subsystem 104, and networking subsystem 106 are coupled together using bus 108. Bus 108 is an electrical, optical, or electro-optical connection that the subsystems can use to communicate commands and data among one another. Although only one bus 108 is shown for clarity, different embodiments can include a different number or configuration of electrical, optical, or electro-optical connections among the subsystems.

Although shown as separate subsystems in FIG. 1, in some embodiments, some or all of a given subsystem can be integrated into one or more of the other subsystems in portable electronic device 100. Although alternative embodiments can be configured in this way, for clarity we describe the subsystems separately.

Portable electronic device 100 can be (or can be included in) any device with at least one processing subsystem and one networking subsystem. For example, portable electronic device 100 can be (or can be included in) a laptop computer, a media player, a subnotebook/netbook, a tablet computer, a cellular phone, a personal digital assistant (PDA), a smartphone, a toy, a controller, or another device.

Portable electronic device 100 may also include one or more additional processing subsystems 102, memory subsystems 104, and/or networking subsystems 106. Additionally, one or more of the subsystems may not be present in portable electronic device 100. Furthermore, although we use specific subsystems to describe portable electronic device 100, in alternative embodiments, portable electronic device 100 may include one or more additional subsystems that are not shown in FIG. 1. For example, portable electronic device 100 may also include, without limitation, a data collection subsystem, an alarm subsystem, an audio subsystem, a display subsystem and/or an input/output (I/O) subsystem. For example, portable electronic device 100 may include a display subsystem which can include any type of display technology such as a light-emitting diode (LED), an organic light-emitting diode (OLED), a liquid crystal display (LCD) (such as thin film transistor (TFT), and/or other types of display technology. In addition, the display subsystem may include mechanisms for processing data, and/or other information for display and may also include an audio subsystem for producing sound. The display subsystem may also include touch screen technology for inputting information into portable electronic device 100. In some embodiments, one or more memory caches and/or processing systems or other hardware modules may be located in the display subsystem.

Networking Subsystem

Figure 2:
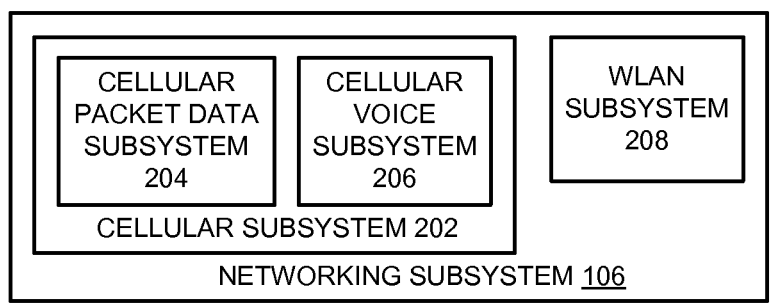
FIG. 2 presents a block diagram illustrating a networking subsystem in a portable electronic device that includes a cellular subsystem and a WLAN subsystem in accordance with described embodiments.

FIG. 2 presents a block diagram illustrating a networking subsystem in a portable electronic device that includes a cellular subsystem and a WLAN subsystem in accordance with described embodiments. Networking subsystem 106 includes WLAN subsystem 208 and cellular subsystem 202 which includes both cellular packet data subsystem 204 and cellular voice subsystem 206.

As discussed above, networking subsystem 106 includes processors, controllers, radios/antennas, sockets/plugs, and/or other devices used for coupling to, communicating on, and handling data and events for each supported networking system, including WLAN and cellular voice information and packet data. For clarity, each subsystem within networking subsystem 106 is depicted separately. Note, however, that in some embodiments one or more of cellular subsystem 202 and WLAN subsystem 208 may share systems, hardware, software, and/or firmware. Additionally, for clarity cellular packet data subsystem 204 and cellular voice subsystem 206 are depicted separately, but in some embodiments they may share some hardware, systems, software, and/or firmware. For example, cellular packet data subsystem 204 and cellular voice subsystem 206 may share a common antenna and resource manager (e.g., in cellular subsystem 202). Also, note that WLAN subsystem 208 and cellular subsystem 202 may be implemented on different chips, and in some embodiments cellular subsystem 202 and WLAN subsystem 208 may each communicate through bus 108 but may not communicate directly with each other.

Operating System

Figure 3:
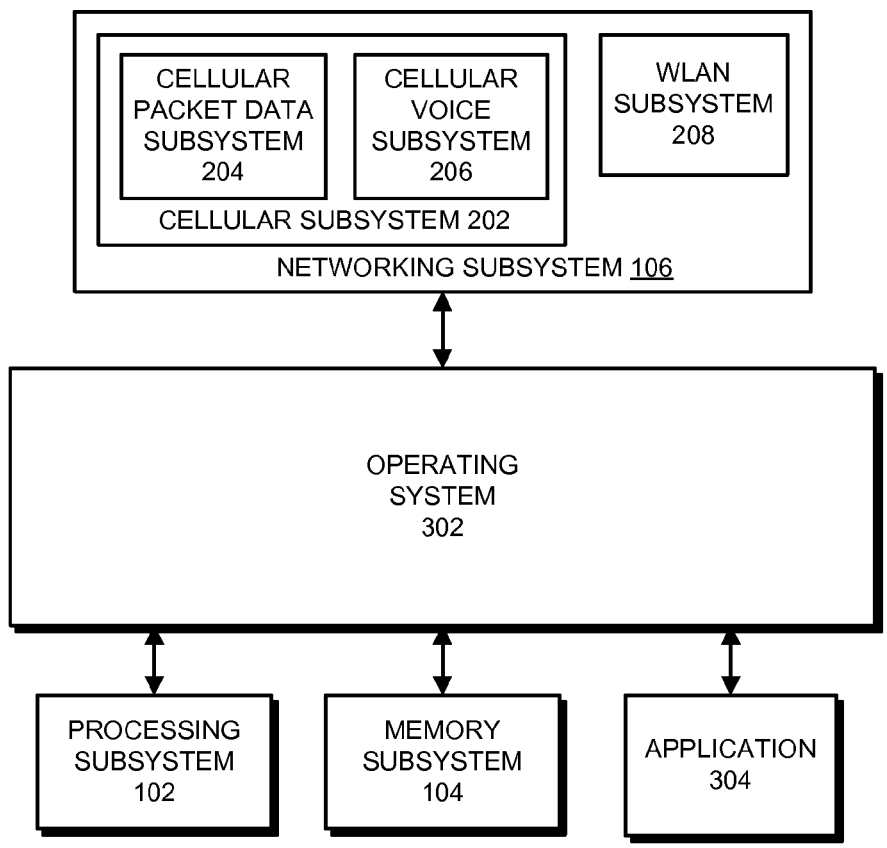
FIG. 3 presents a block diagram illustrating an operating system, application and subsystems of an electronic device in accordance with described embodiments.

FIG. 3 presents a block diagram illustrating operating system 302 in accordance with the described embodiments. In some embodiments, operating system 302 is stored (as program code) in memory subsystem 104 and executed by processing subsystem 102.

Generally, operating system 302 serves as an intermediary between system hardware in portable electronic device 100 (e.g., subsystems 102-106) and applications executed by processing subsystem 102, such as application 304 (which can be, for example, an email application, a web browser, a text messaging application, a voice communication application, and/or a game application). For example, operating system 302 can be, but is not limited to, the iOS operating system or OS X operating system, both from Apple Inc. of Cupertino, Calif.; Windows Phone from Microsoft Corporation; Android from the Open Handset Alliance; the FreeBSD operating system from The FreeBSD Foundation of Boulder, Colo.; or another operating system. Operating systems and their general functions are known in the art and hence are not described in detail.

To manage the transfer of packets to and from application 304 and operating system 302 in portable electronic device 100 using an appropriate interface in networking subsystem 106, operating system 302 maintains one or more network protocol stacks (not shown) that each includes a number of logical layers. For example, the operating system can maintain a cellular protocol stack and/or an Internet protocol stack, which includes the link, Internet, transport, and application layers. As another example, the operating system can maintain a protocol stack based on the OSI model, which includes the application, presentation, session, transport, network, data-link, and physical layers. At corresponding layers of the protocol stack, the operating system includes control mechanisms and data structures for performing the functions associated with the layer. The functions associated with each of the layers in the protocol stack are known in the art and hence are not described in detail.

Communication between WLAN and Cellular Subsystems

Figure 4:
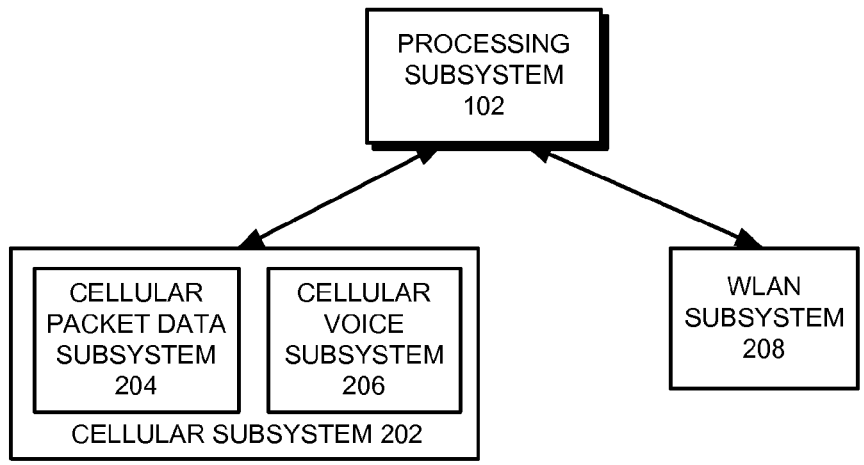
FIG. 4 presents a block diagram depicting the communication paths between a cellular subsystem, a WLAN subsystem and a processing subsystem in a portable electronic device in accordance with described embodiments.

FIG. 4 presents a block diagram depicting the communication paths between a cellular subsystem, a WLAN subsystem and a processing subsystem in a portable electronic device in accordance with described embodiments. In some embodiments, cellular subsystem 202 and WLAN subsystem 208 are implemented on separate chips. Each chip communicates with processing subsystem 102 (e.g., through bus 108). Note that, in some embodiments, messages or other information may only be communicated between cellular subsystem 202 and WLAN subsystem 208 through processing subsystem 102.

For example, cellular subsystem 202 may be implemented using a chip set (e.g., baseband radio chips) which together implement both cellular packet data subsystem 204 and cellular voice subsystem 206. WLAN subsystem 208 may be implemented on a single chip or chipset that is separate from the chip or chipset used to implement cellular subsystem 202. In these embodiments, any communication or other transfer of information between WLAN subsystem 208 and cellular subsystem 202 is mediated by processing subsystem 102. For example, in some embodiments, WLAN subsystem 208 may communicate information to cellular subsystem 202 (and/or cellular packet data subsystem 204) by first transmitting the information to processing subsystem 102, and then processing subsystem 102 communicates the information to cellular subsystem 202 (and/or cellular packet data subsystem 204).

Note that in some embodiments, not depicted in FIG. 4, cellular subsystem 202 and WLAN subsystem 208 may communicate directly with each other without communicating through processing subsystem 102.

Controlling Power State of Cellular Subsystem

Figure 5:
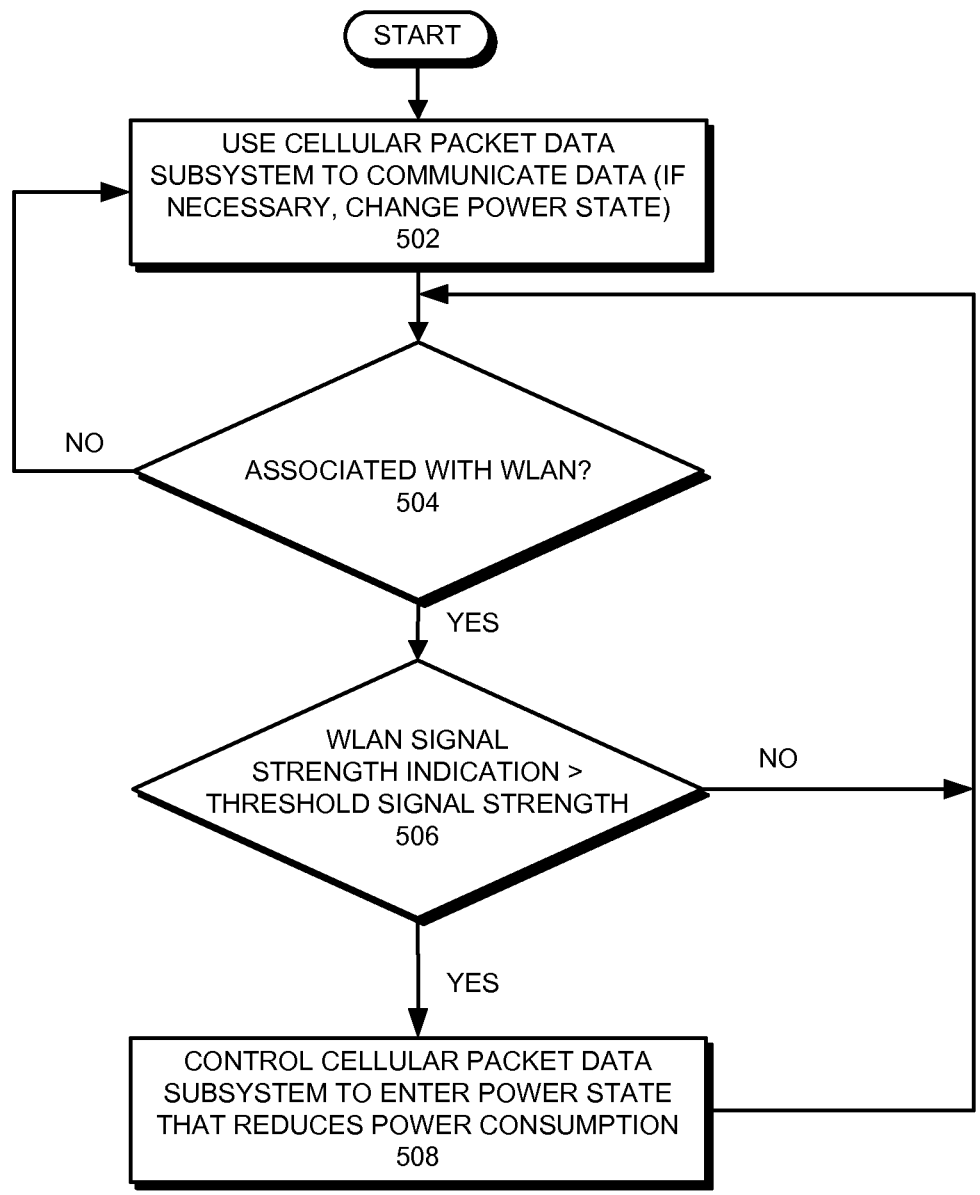
FIG. 5 presents a flowchart illustrating a process for controlling a power state of a cellular packet data subsystem in a portable electronic device in accordance with described embodiments.

FIG. 5 presents a flowchart illustrating a process for controlling a power state of a cellular packet data subsystem in a portable electronic device in accordance with described embodiments. The operations shown in FIG. 5 may be performed by a portable electronic device, such as portable electronic device 100.

The process of FIG. 5 may begin when portable electronic device 100 uses cellular packet data subsystem 204 to communicate using a cellular packet data network (step 502). If portable electronic device 100 is not already in a power state that allows communication of data using cellular packet data subsystem 204, then cellular packet data subsystem 204 is controlled by portable electronic device 100 (e.g., through processing subsystem 102 controlling a resource manager in cellular subsystem 202 and/or cellular packet data subsystem 204) to enter a power state that allows communication of packet data. For example, cellular packet data subsystem 204 may be controlled to power-up modems, amplifiers, and/or increase the frequency at which the cellular data signal is checked and/or searched for.

Then, at some point, portable electronic device 100 may come into range of a WLAN such as a Wi-Fi hotspot, or a home or office WLAN. When portable electronic device 100 is within range of a WLAN, it may try to connect (e.g., associate) with the WLAN. For example, if the user and/or portable electronic device 100 have sufficient permission (e.g., password, membership, etc.), then WLAN subsystem 208 may attempt to associate with the WLAN. At step 504, if portable electronic device 100 associates with the WLAN, the process continues to step 506. If portable electronic device 100 does not associate with the WLAN, then at step 504 the process returns to step 502 and portable electronic device 100 continues to communicate data using cellular packet data subsystem 204.

At step 506, if the WLAN signal strength (e.g., received signal strength indication (RSSI)) is not greater than a threshold signal strength, then the process returns to step 504. However, if the WLAN signal strength is greater than the threshold signal strength, then the process continues to step 508. In some embodiments, at step 506, the WLAN received signal strength must be above the threshold signal strength for a predetermined period of time (e.g., 30 seconds, 1 minute, or 2 minutes) in order to proceed to step 508. Additionally, in some embodiments, step 506 may be eliminated, so that after portable electronic device 100 associates with a WLAN, then the process proceeds directly from step 504 to step 508.

At step 508, cellular packet data subsystem 204 is controlled to enter a power state that reduces the power consumption of portable electronic device 100, and the process returns to step 504. As discussed above, cellular packet data subsystem 204 may be put into a power state that reduces its power consumption by doing one or more of the following: de-energizing or putting into a standby mode one or more power amplifiers and/or modems, and reducing the frequency at which a cellular data signal is searched for or monitored. Note that when cellular packet data subsystem 204 is put into the power state that reduces its power consumption and portable electronic device 100 is transmitting packet data, the packet data is routed down from the application layer through the protocol stack to WLAN subsystem 208 for transmission (i.e., not to cellular packet data subsystem 204), and received packet data is received by WLAN subsystem 208 and from there routed up the protocol stack to the application layer. In some embodiments, cellular voice subsystem 206 is still active (e.g., receiving pages, and transmitting and receiving voice information through a circuit-switched network).

In some embodiments, at step 508 processing subsystem 102 may directly control cellular packet data subsystem 204 and/or other systems in cellular subsystem 202 to enter the power state that reduces its power consumption. In other embodiments, processing subsystem 102 may control a resource manager in cellular subsystem 202 and/or a resource manager in cellular packet data subsystem 204 to put cellular packet data subsystem 204 and/or cellular subsystem 202 in the power state that reduces the power consumption of cellular packet data subsystem 204. For example, processing subsystem 102 may receive an indication of when WLAN subsystem 208 is associated with a WLAN and/or the RSSI from WLAN subsystem 208. Processing subsystem 102 may forward the RSSI to a resource manager in cellular subsystem 202 for use in performing step 506. The resource manager may then perform step 506, and when the conditions are met, the resource manager controls cellular packet data subsystem 204 to enter a power state that reduces its power consumption.

Then, at step 504 if portable electronic device 100 is no longer associated with the WLAN, or at step 506 if the conditions (of step 506) are not met, then the process returns to step 502 and the resource manager may control cellular packet data subsystem 204 to enter a higher power consumption power state, for example by increasing the frequency at which the cellular data signal is monitored or searched for, and/or re-energizing any systems necessary to transmit packet data which were put in a lower power state in step 508, such as modems, amplifiers, and data buses in cellular packet data subsystem 204.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for use in a portable electronic device, wherein the portable electronic device comprises:
   a wireless local area network (WLAN) subsystem;
   a cellular packet data subsystem for communicating packet data;
   a cellular voice subsystem for communicating cellular voice information; and
   a processing subsystem;
wherein the method comprises:
   while communicating packet data using the cellular packet data subsystem,
      establishing, with the WLAN subsystem, a connection to a WLAN;
      determining, with the WLAN subsystem, a signal strength of the connection to the WLAN;
      determining, with the processing subsystem, based at least in part on the signal strength of the connection to the WLAN exceeding a threshold, to switch from the cellular packet data subsystem to the WLAN subsystem for the communication of the packet data to and from the portable electronic device;
      setting the cellular packet data subsystem into a reduced power state that reduces power consumption of the cellular packet data subsystem, wherein the setting the cellular packet data subsystem into the reduced power state comprises reducing a search frequency for a cellular data signal; and
      communicating, with the WLAN subsystem, the packet data to and from the portable electronic device while the cellular data subsystem is in the reduced power state.

2. The method of claim 1, wherein the setting the cellular packet data subsystem into the reduced power state comprises de-energizing one or more power amplifiers in a baseband radio in the cellular packet data subsystem.

3. The method of claim 1, wherein the setting the cellular packet data subsystem into the reduced power state comprises reducing a frequency at which a cellular data signal is monitored.

4. The method of claim 1, wherein the setting the cellular packet data subsystem into the reduced power state comprises controlling a resource manager in the cellular packet data subsystem using the processing subsystem to set the cellular packet data subsystem into the reduced power state.

5. The method of claim 1, wherein in response to the cellular packet data subsystem being set in the reduced power state, a power state of the cellular voice subsystem is not changed.

6. The method of claim 1, wherein the signal strength of the connection to the WLAN exceeds the threshold for a predetermined period of time.

7. A non-transitory computer-readable storage medium containing instructions related to a method executed by a portable electronic device, wherein the portable electronic device includes:
   a wireless local area network (WLAN) subsystem;
   a cellular packet data subsystem for communicating packet data;
   a cellular voice subsystem for communicating cellular voice information; and
   a processing subsystem;
wherein the method comprises:
   establishing, with the WLAN subsystem, a connection to a WLAN;
   determining, with the WLAN subsystem, a signal strength of the connection to the WLAN;
   in response to the signal strength exceeding a threshold:
      selecting the WLAN subsystem for the communication of packet data to and from the portable electronic device; and
      setting the cellular packet data subsystem into a reduced power state that reduces power consumption of the cellular packet data subsystem, wherein the setting the cellular packet data subsystem into the reduced power state comprises reducing a search frequency for a cellular data signal; and
   communicating, with the WLAN subsystem, the packet data to and from the portable electronic device while the cellular data subsystem is in the reduced power state.

8. The non-transitory computer-readable storage medium of claim 7, wherein the setting the cellular packet data subsystem into the reduced power state comprises de-energizing one or more power amplifiers in a baseband radio in the cellular packet data subsystem.

9. The non-transitory computer-readable storage medium of claim 7, wherein the setting the cellular packet data subsystem into the reduced power state comprises reducing a frequency at which a cellular data signal is monitored.

10. The non-transitory computer-readable storage medium of claim 7, wherein the setting the cellular packet data subsystem into the reduced power state comprises controlling a resource manager in the cellular packet data subsystem using the processing subsystem to set the cellular packet data subsystem into the reduced power state.

11. The non-transitory computer-readable storage medium of claim 7, wherein in response to the cellular packet data subsystem being set in the reduced power state, a power state of the cellular voice subsystem is not changed.

12. The non-transitory computer-readable storage medium of claim 7, wherein the signal strength of the connection to the WLAN exceeds the threshold for a predetermined period of time.

13. An apparatus that controls a power state of a cellular packet data subsystem in a portable electronic device, comprising:
   a cellular voice subsystem;
   a wireless local area network (WLAN) subsystem that establishes a connection to a WLAN; and
   a processing subsystem configured to:
      receive, from the WLAN subsystem, after establishing the connection to the WLAN, a signal strength of a connection to the WLAN;
      in response to the signal strength exceeding a threshold, select the WLAN subsystem for the communication of the packet data to and from the portable electronic device;

set the cellular packet data subsystem into a reduced power state that reduces a power consumption of the cellular packet data subsystem, wherein the cellular packet data subsystem is configured to reduce a search frequency for a cellular data signal in the reduced power state; and communicate the packet data to and from the portable electronic device using the WLAN subsystem while the cellular data subsystem is in the reduced power state.

14. The apparatus of claim 13, wherein the cellular packet data subsystem is configured to de-energize one or more power amplifiers in a radio in the cellular packet data subsystem when set in the reduced power state.

15. The apparatus of claim 13, wherein the cellular packet data subsystem is configured to reduce a frequency at which a cellular data signal is monitored when set in the reduced power state.

16. The apparatus of claim 13, wherein the processing subsystem is further configured to set the cellular packet data subsystem into the reduced power state by controlling a resource manager in the cellular packet data subsystem.

17. The apparatus of claim 13, wherein when the processing subsystem sets the cellular packet data subsystem into the reduced power state, and wherein the processing subsystem is configured to keep a power state of the cellular voice subsystem unchanged.

18. The apparatus of claim 13, wherein the processing subsystem is further configured to select the WLAN subsystem for the communication of the packet data to and from the portable electronic device in response to the signal strength exceeding the threshold for a predetermined period of time.

* * * * *